(12) United States Patent
English et al.

(10) Patent No.: US 7,702,870 B2
(45) Date of Patent: Apr. 20, 2010

(54) METHOD AND APPARATUS FOR DEFRAGMENTATION AND FOR DETECTION OF RELOCATED BLOCKS

(75) Inventors: Robert M. English, Menlo Park, CA (US); Ashish Prakash, Morrisville, NC (US)

(73) Assignee: Network Appliance Inc., Sunnyvale, CA (US)

( * ) Notice: Subject to any disclaimer, the term of this patent is extended or adjusted under 35 U.S.C. 154(b) by 955 days.

(21) Appl. No.: 11/336,755

(22) Filed: Jan. 19, 2006

(65) Prior Publication Data

US 2007/0168633 A1    Jul. 19, 2007

(51) Int. Cl.
*G06F 12/00* (2006.01)
*G06F 13/00* (2006.01)
*G06F 13/28* (2006.01)

(52) U.S. Cl. ..................................... 711/165
(58) Field of Classification Search .................. 711/165
See application file for complete search history.

(56) References Cited

U.S. PATENT DOCUMENTS

| | | | | |
|---|---|---|---|---|
| 5,530,958 | A * | 6/1996 | Agarwal et al. ............... 711/3 |
| 5,897,661 | A * | 4/1999 | Baranovsky et al. ......... 711/170 |
| 6,253,285 | B1 * | 6/2001 | Razdan et al. ............... 711/118 |
| 6,571,261 | B1 * | 5/2003 | Wang-Knop et al. ........ 707/206 |
| 6,578,131 | B1 * | 6/2003 | Larson et al. ................ 711/216 |
| 6,629,198 | B2 * | 9/2003 | Howard et al. ............... 711/112 |
| 6,978,283 | B1 * | 12/2005 | Edwards et al. ............. 707/206 |
| 7,139,863 | B1 * | 11/2006 | Defouw et al. .............. 711/103 |
| 2005/0027735 | A1 * | 2/2005 | Cabrera et al. ............... 707/102 |
| 2005/0149586 | A1 * | 7/2005 | Lange et al. ................. 707/205 |
| 2005/0187985 | A1 * | 8/2005 | Edwards et al. ............. 707/200 |
| 2007/0168633 | A1 * | 7/2007 | English et al. ............... 711/165 |

OTHER PUBLICATIONS

Network Appliance, "FlexVol and FlexClone Software", Storage Solutions, Oct. 29, 2004, 2 pages.
Michael Fisch, "NetApp FlexVol and FlexClone Raise the Rate of Return on Storage Resources", The Clipper Group Navigator, Nov. 15, 2004, 3 pages.
Wikipedia—The Free Encyclopedia, "Log-structured File System", Sep. 19, 2005, http://en.wikipedia.org/wiki/Log-structured_File_System, 2 pages.

* cited by examiner

*Primary Examiner*—Sheng-Jen Tsai
(74) *Attorney, Agent, or Firm*—Blakely, Sokoloff, Taylor & Zafman LLP

(57) ABSTRACT

A method of operating a storage system includes moving a block of data stored in the storage system to a new location in the storage system, such as for purposes of defragmentation. After the block has been moved to the new location, the storage system receives a request requiring access to the block. The storage system uses metadata appended to an identified block to detect that the block may have been relocated. The metadata can further be used to distinguish a block that has been relocated from a lost write.

27 Claims, 9 Drawing Sheets

METHOD AND APPARATUS FOR DEFRAGMENTATION AND FOR DETECTION OF RELOCATED BLOCKS

FIELD OF THE INVENTION

At least one embodiment of the present invention pertains to data storage systems, and more particularly, to a technique for defragmentation of data or free space and for detecting data that has been moved due to defragmentation.

BACKGROUND

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

A storage server typically includes one or more file systems. A file system, as the term is used here, is a structured (e.g. hierarchical) set of stored data, such as files, directories and/or other types of data containers. As a file system ages and services client-initiated write requests, data and free space tend to become fragmented, a process that accelerates as the amount of free space decreases. As a result of fragmentation, read and write performance tend to degrade over time.

Fragmentation can be fixed by moving (relocating) data on disk, a process known as defragmentation. However, defragmentation can be expensive from a performance standpoint. Reads of existing data on disk in preparation for relocation may compete with the servicing of client requests, discouraging relocation in heavily-loaded systems that would most benefit from it.

SUMMARY OF THE INVENTION

The present invention includes a method of operating a storage system. In one embodiment, the method includes receiving a data access request, identifying a particular block stored in the storage system as potentially being a target block of the request, and using metadata appended to the identified block to detect that the target block of the request may have been relocated.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
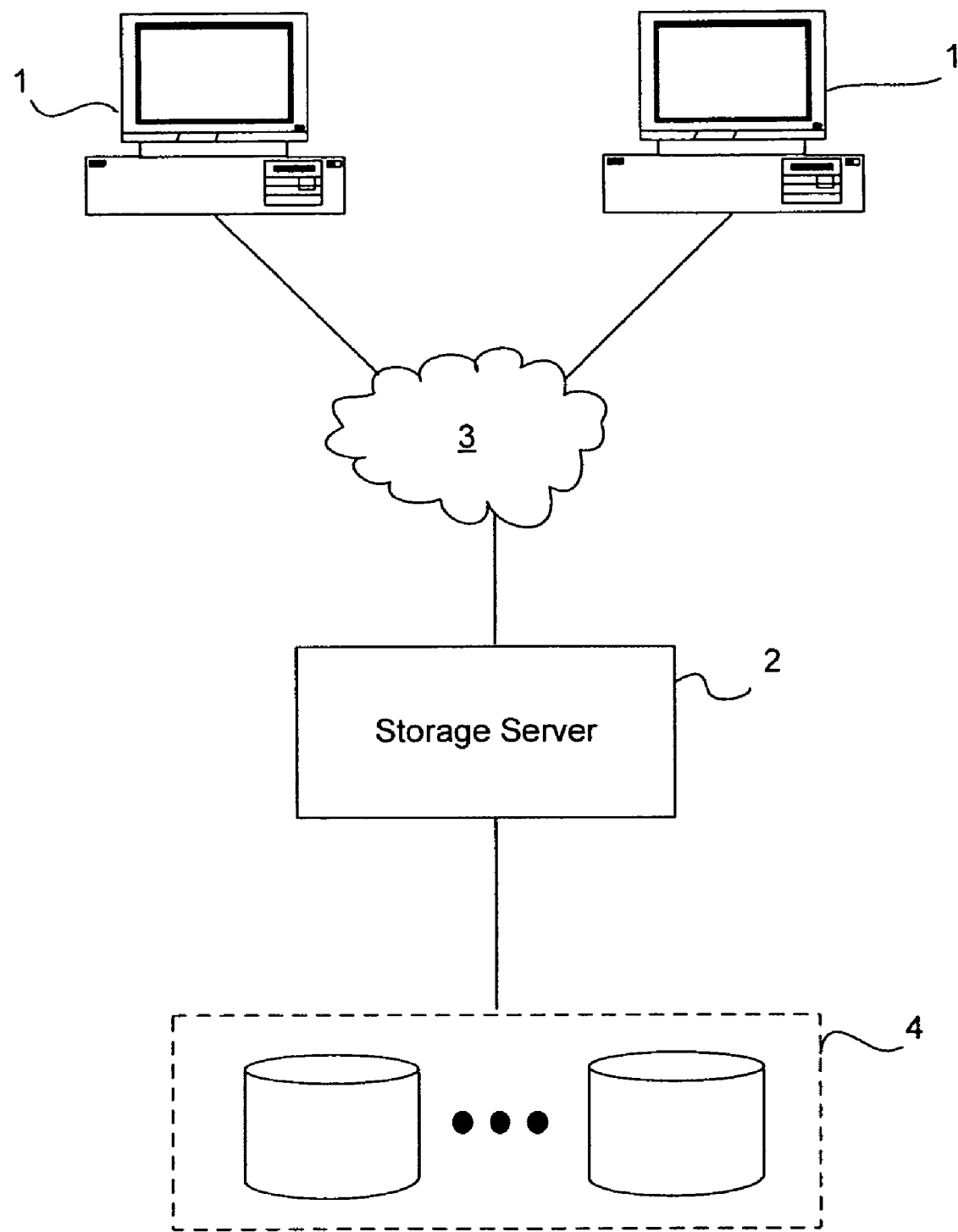
FIG. 1 illustrates a storage network environment which includes a storage server.

A method and apparatus for defragmentation in a storage system and for detecting data moved during defragmentation are described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment.

One aspect of the technique introduced here, as described further below, is that for defragmentation purposes, certain blocks are moved during the course of normal read operations, i.e., reads that are initiated for purpose other than defragmentation, such as a client-initiated read request or a disk read for purposes of RAID parity computation. A "block", as the term is used herein is a contiguous set of data of a known length starting at a particular offset value. In certain embodiments of the invention, blocks contain 4 kBytes of data and/or metadata. In other embodiments, blocks can be of a different size or sizes.

Another aspect of the technique, as described further below, is that block-appended metadata is used to distinguish blocks that have been relocated (e.g., due to defragmentation) from lost writes. Another aspect of the technique is that even blocks that are part of a persistent point-in-time image (PPI) of a data set can be moved (e.g., for defragmentation purposes) without losing the ability to locate those blocks.

The following is an overview of the technique, in accordance with certain embodiments of the invention. A storage server maintains various hierarchical data structures, called buffer trees, to keep track of the organization of blocks stored in an "aggregate" (defined below). A buffer tree may represent, for example, a "volume" (defined below) defined within an aggregate or a file defined within a volume. For any particular file, there are generally two relevant buffer trees, namely a container file buffer tree (hereinafter "container buffer tree") and a user file buffer tree (hereinafter "user buffer tree"). The user buffer tree represents the particular file, while the container buffer tree represents the volume which contains the file. Normally, the user buffer tree is used to locate blocks in a file in response to a client-initiated read or write request.

Each buffer tree typically references numerous blocks. Some of these blocks contain actual data—these are referred to as "direct blocks". Some blocks in a buffer tree simply contain pointers to other blocks—these are referred to as "indirect blocks". There can be multiple levels of indirect blocks in a buffer tree, however, there is always only one level of direct blocks, which is the lowest level of the buffer tree. The root of the buffer tree is known as an "inode", which is a metadata structure that contains metadata about the file.

Every inode and indirect block in the user buffer tree includes a pair of associated pointers for every lower level block that it references, namely, a Physical Volume Block Number (PVBN) and a Virtual Volume Block Number (VVBN). Every inode and indirect block in the container buffer tree also includes PVBN for every lower level block that it references. A PVBN is an address of a physical block in an aggregate. A VVBN is an address of the block in the volume which contains the file, i.e., the offset of the block within the volume. The relevance of these pointers to the technique introduced here is discussed below.

A particular number of consecutive blocks across each disk in a RAID group is known as a "segment" (i.e., a "stripe" across a RAID group). A disk normally can store multiple segments. For purposes of defragmentation, the blocks in a segment are normally evaluated together, as a segment, and to the extent possible, are moved together. Whether the blocks in a particular segment are good candidates for relocation (i.e., for defragmentation) can be determined at essentially any time and can be based on, for example, the free space distribution on disk and the incoming sequence of reads. Whether to relocate a given block can be decided based on a predetermined policy, heuristic, algorithm, etc.; the specific manner for making such a decision is not germane to the technique introduced here.

Defragmentation involves moving various blocks to new locations in the aggregate (i.e., relocating blocks). In accordance with the technique introduced here, certain blocks are moved, for defragmentation purposes (particularly for cleaning free space), during the course of normal read operations by the storage server, such as client-initiated reads, reads for RAID parity computation, etc. (More precisely, the blocks are marked as "dirty", i.e. tagged as "to be moved", during a read and are actually moved at the next "consistency point", as discussed below.) A read of a block requires that the user buffer tree which contains the block be loaded into main memory in the storage server. Consequently, when a block is moved during a read, the user buffer tree for the block is already in memory, and its PVBNs can be immediately updated to reflect the block move, without any additional performance cost. However, that approach is not sufficient to adequately clean free space on disk, because not all blocks are read during normal read operations.

Therefore, according to the technique introduced here, blocks are also moved independently of normal reads, i.e., during a defragmentation or "segment cleaning" process, to clean free space on disk. When that is done, the user buffer trees for at least some moved blocks will not be available in memory to be updated. Nonetheless, the technique introduced here does not require those buffer trees to be immediately loaded and updated to reflect the moved blocks (which would have performance cost); in fact, those buffer trees do not have to be updated at all, as will be apparent from the description which follows. However, this approach does require a way of identifying and locating moved blocks in the event there is an attempt to access such blocks (e.g., a client-initiated read) before their user buffer trees have been updated.

In other words, this approach raises the following issues: 1) how to determine whether a particular block being accessed is the correct block; 2) if the block is not the correct block, how to distinguish a block that has been simply moved (e.g., due to defragmentation) from a lost write; and 3) if a block has been moved due to defragmentation (or for other reasons), how to find the block at its new location if its PVBN has not been updated in the user buffer tree.

The technique introduced here handles the first issue (how to determine whether a block being accessed is the correct block) by examining metadata appended to the block. Specifically, each block stored on disk has a metadata field appended to it. The metadata stored within this field can be used to detect lost writes and for other purposes. A "lost write" is a write operation that has been requested by an entity (such as a client) but which, for some reason (such as a hardware fault), was not successfully committed to disk.

The metadata field of each block includes metadata that was assigned to that block by the file system manager. Accordingly, when any block is accessed (e.g., during a read), the metadata in its metadata field is compared to the corresponding metadata in the parent indirect block of that block in the user buffer tree. If these sets of metadata match, the block is assumed to be the correct block. If there is any mismatch between the block-appended metadata and the expected metadata, then the block has either been moved (e.g., due to defragmentation), or a write was lost.

When there is such a mismatch in the metadata, the next issue is to determine whether the block is a lost write or has simply been relocated (moved). If the latter is true, it is necessary to determine where the correct block is actually located. To accomplish both goals, the corresponding container buffer tree is used. Specifically, the VVBN from the parent indirect block in the user buffer tree is used as an index into the container buffer tree, to locate the correct PVBN for the required block.

Once the correct block is located, its metadata is used in the same manner described above, to determine whether it is the correct block. If it is the correct block, then that block is returned to the calling process as the result. (Of course, a single read request may require access to multiple blocks in this manner.) The PVBN in the corresponding indirect block in the user buffer tree is also corrected at a convenient time (which may be immediately, since the indirect block is already in memory at this point). If the block is not the correct block, then it is assumed that the required block was part of a lost write. In that case, an appropriate error indication is returned to the calling process (which may initiate a lost write recovery mechanism, if available).

To simplify this description, it is assumed that only direct (L0) blocks can be relocated, and therefore, that only the metadata of direct blocks is examined for mismatches, not indirect blocks. However, in a real implementation, blocks at any level of a buffer tree (including indirect blocks) potentially can be relocated. Therefore, in a real implementation it would also be desirable to examine metadata of indirect blocks for VVBN mismatches in this way.

Note that the container buffer tree for any online volume is frequently available in memory, and can be used this way to locate any moved block, even when the user buffer tree for that block is not in memory. If the container map is in memory, it is not necessary to update the user buffer tree immediately when a block is moved during defragmentation. In fact, when that is the case, there is no need to update a user buffer tree at all to reflect a block move, for the same reason. However, it may be desirable nonetheless to do so, at a convenient time, since having an up-to-date user buffer tree will improve read performance (because it avoids the relatively time-consuming process of block location being described here).

Before further discussing this technique, it is useful to discuss certain background information and to define certain terminology. In some conventional storage servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. A "file system" is an independently managed, self-contained, hierarchal set of data units (e.g., files, blocks or LUNs). Although a volume or file system (as those terms are used herein) may store data in the form of files, that is not necessarily the case. That is, a volume or file system may store data in the form of other units of data, such as blocks or LUNs.

It is assumed here, to facilitate description only and not by way of limitation, that a storage system which implements the technique introduced here is capable of creating and maintaining two different types of volumes: flexible volumes and traditional volumes. A "traditional volume" has a fixed, one-to-one relationship with the underlying physical storage (aggregate). In contrast, a "flexible volume" is flexibly associated with the underlying aggregate. In other words, the boundaries between aggregates and flexible volumes are flexible, such that there does not have to be a one-to-one relationship between a flexible volume and an aggregate. An aggregate can contain one or more flexible volumes. Henceforth in this description, all references to a "volume" or "volumes" shall refer to flexible volumes, unless stated otherwise.

FIG. 1 shows a simple example of a network environment which incorporates a storage server 2, in which the technique introduced here can be implemented. For example, the technique can be adapted for use in other types of storage systems, such as storage servers which provide clients with block-level access to stored data or processing systems other than storage servers. The storage server 2 is coupled to a storage subsystem 4 which includes a set of mass storage devices, and to a set of storage clients 1 (hereinafter simply "clients") through a network 3. The network 3 may be, for example, a local area network (LAN), a wide area network (WAN), a global area network (GAN) such as the Internet, a Fibre Channel fabric, or a combination of such networks. Each of the clients 1 may be, for example, a conventional personal computer (PC), server-class computer, workstation, or the like.

The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data.

Although illustrated as a self-contained element, the storage server 2 may have a distributed architecture; for example, it may include a separate N- ("network") blade and D- (disk) blade (not shown). In such an embodiment, the N-blade is used to communicate with clients 1, while the D-blade includes the file system functionality and is used to communicate with the storage subsystem 4. The N-blade and D-blade communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

Figure 2:
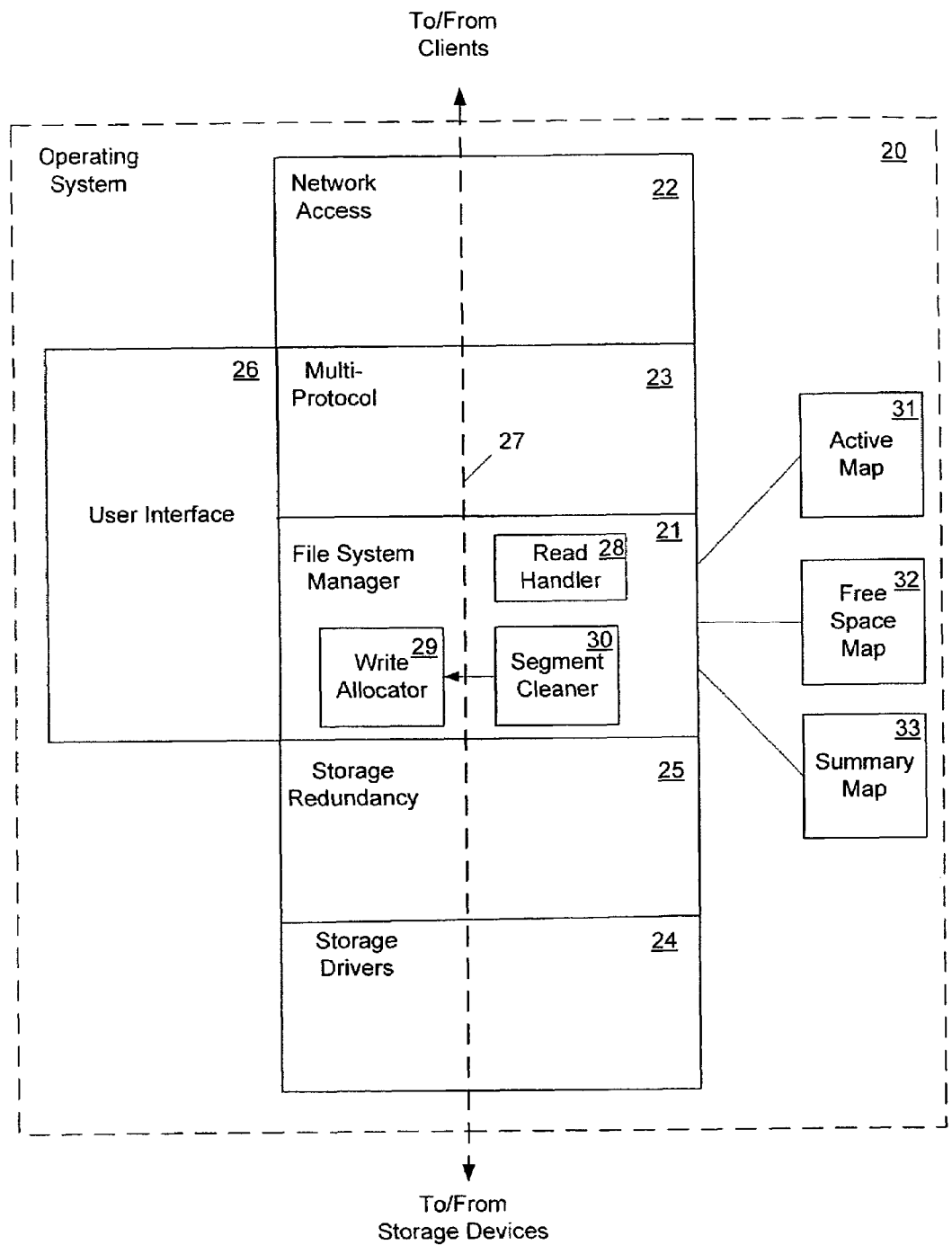
FIG. 2 illustrates the architecture of the operating system of the storage server.

The storage server 2 includes an operating system to control its operation, an example of which is shown in FIG. 2. The operating system 20 and its constituent elements are preferably implemented in the form of software. However, in some embodiments, some or all of the elements of the operating system may be implemented in the form of hardware (e.g., specially designed circuitry), or as a combination of hardware and software.

As shown, the operating system 20 includes several modules, or "layers". These layers include a file system manager 21. The file system manager 21 is software that manages the one or more file systems managed by the storage server 2. In particular, the file system manager 21 imposes a hierarchy (e.g., a directory/file structure) on the data stored in the storage subsystem 4 and manages client-initiated read and write operations at a high level (while delegating certain functions to lower layers of the operation system 20).

To allow the storage server 2 to communicate over the network 3 (e.g., with clients 1), the operating system 20 also includes a network access layer 22, and a protocol layer 23 operatively coupled between the file system manager 21 and the network access layer 23. The protocol layer 22 implements a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 23 includes one or more drivers which implement one or more lower-level protocols to communicate over the network, such as Ethernet or Fibre Channel.

To enable the storage server 2 to communicate with the storage subsystem 4, the operating system 20 includes a storage driver layer 24, and a storage access layer 25 operatively coupled between the file system manager 21 and the storage driver layer 24. The storage access layer 25 implements a higher-level disk storage protocol, such as RAID-4, RAID-5 or RAID-DP, while the storage driver layer 24 implements a lower-level storage device access protocol, such as Fibre Channel Protocol (FCP) or SCSI. The storage access layer 25 is alternatively called the "RAID layer" in this description.

Also shown in FIG. 2 is the path 27 of data flow, through the operating system 20, associated with a client-initiated read or write request.

The operating system 20 also includes a user interface 26 to generate a command line interface (CLI) and/or graphical user interface (GUI), to allow administrative control and configuration of the storage server 2, from a local or remote terminal.

The file system manager 21 also includes a read handler 28, a write allocator 29 and a segment cleaner 30. The read handler 28 is responsible for processing client-initiated read requests. This functionality includes sending appropriate commands, messages and/or metadata to the storage access layer 25 for purposes of responding to such a request. The write allocator 29 is responsible for determining an appropriate storage destination whenever a block is written. This may be done in response to, for example, a client-initiated write request, a RAID parity recomputation, or a defragmentation process. The segment cleaner 30 is responsible for determining which segments (groups of contiguous disk blocks) to move during defragmentation, as described further below. Accordingly, the segment cleaner 30 provides information on its determinations to the write allocator 29, which decides where to place the relocated blocks.

The operating system 20 also maintains three special types of data structures used by the file system manager 21 to keep track of used and free space in the storage subsystem 4. These data structure types include an active map 31, a free space map 32 and a summary map 33. A separate instance of each of these three data structures is maintained for each aggregate and for each flexible volume managed by the storage server 2.

The active map 31 of a volume indicates which PVBNs are currently used (allocated) in an active file system. The free space map 32 indicates which PVBNs in the volume are free (not allocated). The summary map 33 indicates which blocks in the volume are used by Snapshots™. A Snapshot is NetApp's implementation of a read-only, persistent, point-in-time image (PPI) of a data set and its associated metadata, such as a volume.

In embodiments of the invention, an aggregate is represented (implemented) as a volume within the storage server 2, and each volume in the aggregate is represented (implemented) as a file, referred to as a "container file", within the volume that represents the aggregate.

An aggregate utilizes a PVBN space that defines the storage space of blocks provided by the disks in the aggregate. Each volume utilizes a logical or "virtual" volume block number (VVBN) space to organize those blocks as files. A PVBN, therefore, is an address of a physical block in the aggregate. A VVBN is an address of a block in a volume (the same block as referenced by the corresponding PVBN), i.e., the offset of the block within the container file that represents the flexible volume. Each VVBN space is an independent set of numbers that corresponds to locations within the file, which locations are then translated to disk block numbers (DBNs) on disk. Since a volume is a logical (not physical) data container, it has its own block allocation structures (e.g., active map, free space map and summary map) in its VVBN space.

Each volume is essentially a separate file system that is "mingled" onto a common set of storage in the aggregate by the operating system 20. The RAID layer 25 builds a RAID topology structure for the aggregate that guides each file system when performing write allocation. The RAID layer 25 also presents to the file system manager 21 a mapping of each PVBN to a corresponding disk number and DBN (and vice versa).

Each file in the aggregate is represented in the form of a user buffer tree. A buffer tree is a hierarchical structure which used to store metadata about the file, including pointers for use in locating the blocks for the file. A buffer tree includes one or more levels of indirect blocks (called "L1 blocks", "L2 blocks", etc.), each of which contains one or more pointers to lower-level indirect blocks and/or to the direct blocks (called "L0 blocks") of the file.

The root of a buffer tree is the "inode" of the file. An inode is a metadata container which used to store metadata about the file, such as ownership of the file, access permissions for the file, file size, file type, and pointers to the highest level of indirect blocks for the file. Each file has its own inode, and each inode is stored in a corresponding inode file for the volume. Each inode file is also represented as a buffer tree, where each direct block of the inode file's buffer tree is an inode.

Figure 3:
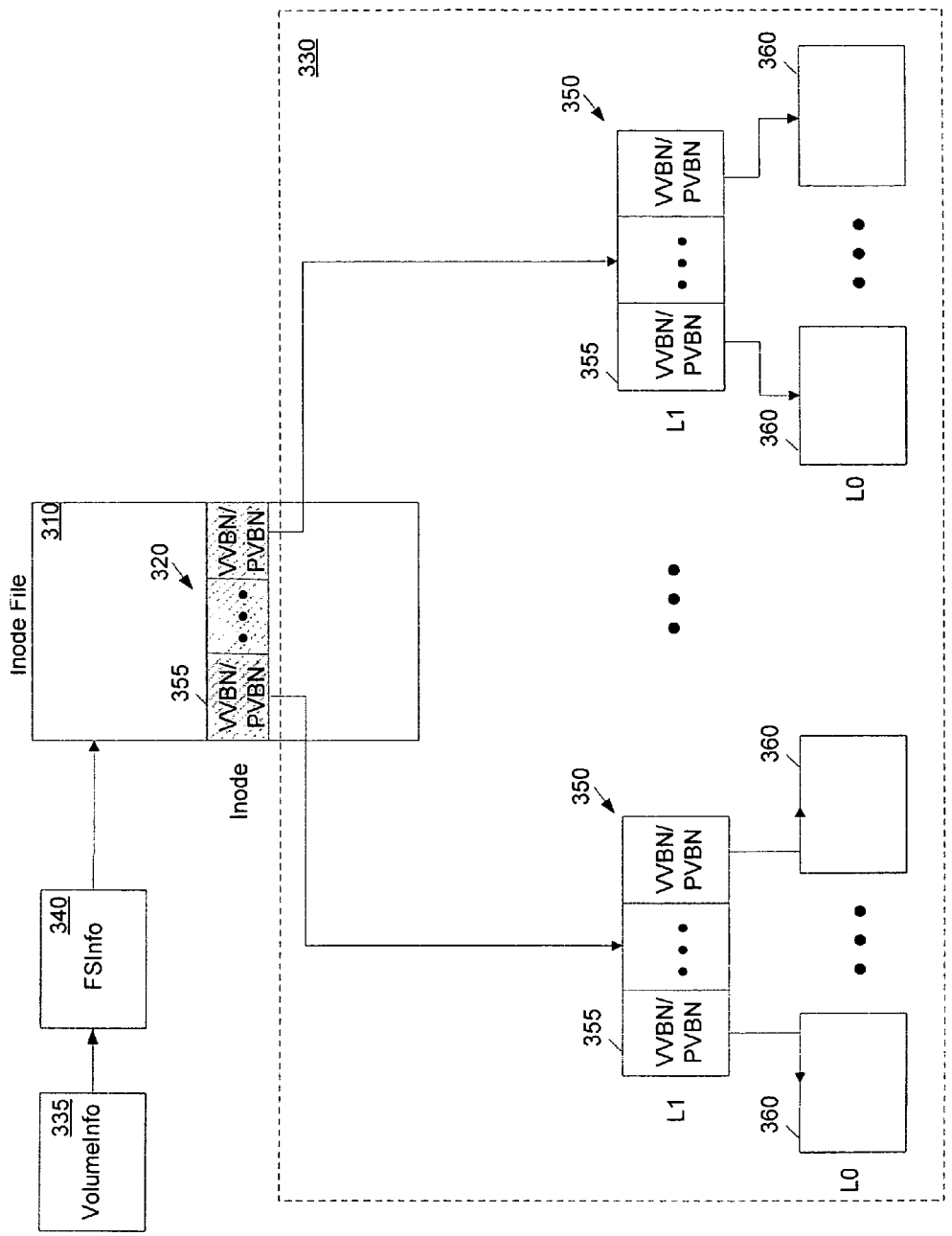
FIG. 3 shows an example of a buffer tree for a file.

FIG. 3 shows an example of a buffer tree 330 for a file within a volume. The file is assigned an inode 320, which in the illustrated embodiment directly references Level 1 (L1) indirect blocks 350. To simplify description, FIG. 3 illustrates an embodiment with only two levels of blocks below the inode, i.e., one level of indirect (L1) blocks 350 and one level of direct (L0) blocks 360. However, the storage server 2 may allow three or more levels of blocks below the inode 320, i.e., two or more levels of indirect blocks (e.g., L1, L2, etc.) and one level of direct (L0) blocks.

Each inode 320 and each indirect block 350 includes at least one storage location ("index") 355 that stores at least one PVBN and a corresponding VVBN. Each PVBN identifies a physical block in the aggregate itself (which may be a direct or indirect block) and the corresponding VVBN identifies the logical block number of that block in the volume. Note that the PVBN and VVBN in any given index 355 both refer to the same block, although one is a physical address and the other is a logical address. The inode and indirect blocks in FIG. 3 are shown pointing to only two lower-level blocks each in FIG. 3, to simplify description. However, any inode 320 or indirect block 350 can actually include more than two PVBN-VVBN pairs, and thus, may refer to a greater number of direct (L0) blocks 360.

As mentioned above, each volume is implemented in the storage system as a file, referred to as a "container file", which is represented by a special buffer tree (the "container buffer tree"). A container buffer tree can have a structure similar to the tree structure of a user file, as shown in FIG. 3; however, a container buffer tree's indirect blocks store only PVBNs, not VVBNs. Every block in a container file represents one VVBN for the flexible volume that the container file represents. Therefore, the L1 indirect blocks of a container buffer tree form a mapping of VVBNs to PVBNs and may therefore be referred to as the "container map" for the flexible volume. The container buffer tree also has an inode, which is assigned an inode number equal to a virtual volume id (VVID).

The container file is typically one large, sparse virtual disk, which contains all blocks owned by the volume it represents. A VVBN in a user buffer tree also represents the file block number (FBN) of the corresponding block within the container file. An FBN of a given block identifies the offset of the block within the file that contains it. A block referenced by a given VVBN, say VVBN X, in a volume can be found at FBN X in the container file. For example, VVBN 2000 in a volume 110 can be found at FBN 2000 in its container file 200. Since each volume 110 in the aggregate 100 has its own distinct VVBN space, one container file in the aggregate may have an FBN 2000 that is different from FBN 2000 in another container file in the aggregate.

Referring again to FIG. 3, for each file system stored by the storage system, the inodes of each file within that file system are stored in a separate inode file 310. Thus, a separate inode file 310 is maintained for each file system within each volume in the storage system. Note that each inode file 310 is itself represented as a buffer tree (although not shown that way in FIG. 3), where each direct block of the inode file's buffer tree is an inode 320.

Each inode 320 in an inode file 310 is the root of the user buffer tree 330 of a corresponding file. The location of the inode file 310 for each file system is stored in metadata container called a corresponding file system information ("FSInfo") block" 340. The FSInfo block 340 contains metadata for the file system rather than for individual files within the file system. Another metadata container, called a volume information ("VolumeInfo") block 335, stores metadata about the volume as a whole, including the locations of the FSInfo block 340 for each file system within that volume.

An aggregate is also represented in the storage server as a volume. Consequently, the aggregate is assigned its own superblock, which contains metadata of the aggregate and points to the inode file for the aggregate. The inode file for the aggregate contains the inodes of all of the flexible volumes within the aggregate, or more precisely, the inodes of all of the container files within the aggregate. Hence, each volume has a structure such as shown in FIG. 3, and the aggregate itself also has a structure such as shown in FIG. 3. As such, the storage system implements a nesting of file systems, where the aggregate is one file system and each volume within the aggregate is also a file system.

As a result of this structure and functionality, every direct (L0) block within a flexible volume is referenced by two separate buffer trees: a user buffer tree (the buffer tree of the file which contains the block) and a container buffer tree (the buffer tree of the container file representing the volume which contains the block).

Note that version 7.0 of the Data ONTAP® storage operating system from NetApp® (initially sold in October 2004) enables the creation and use of flexible volumes, using multi-level buffer trees with dual PVBN-VVBN pointers to blocks in the manner described in FIG. 3 and container buffer trees to represent flexible volumes as described above.

Figure 5A:
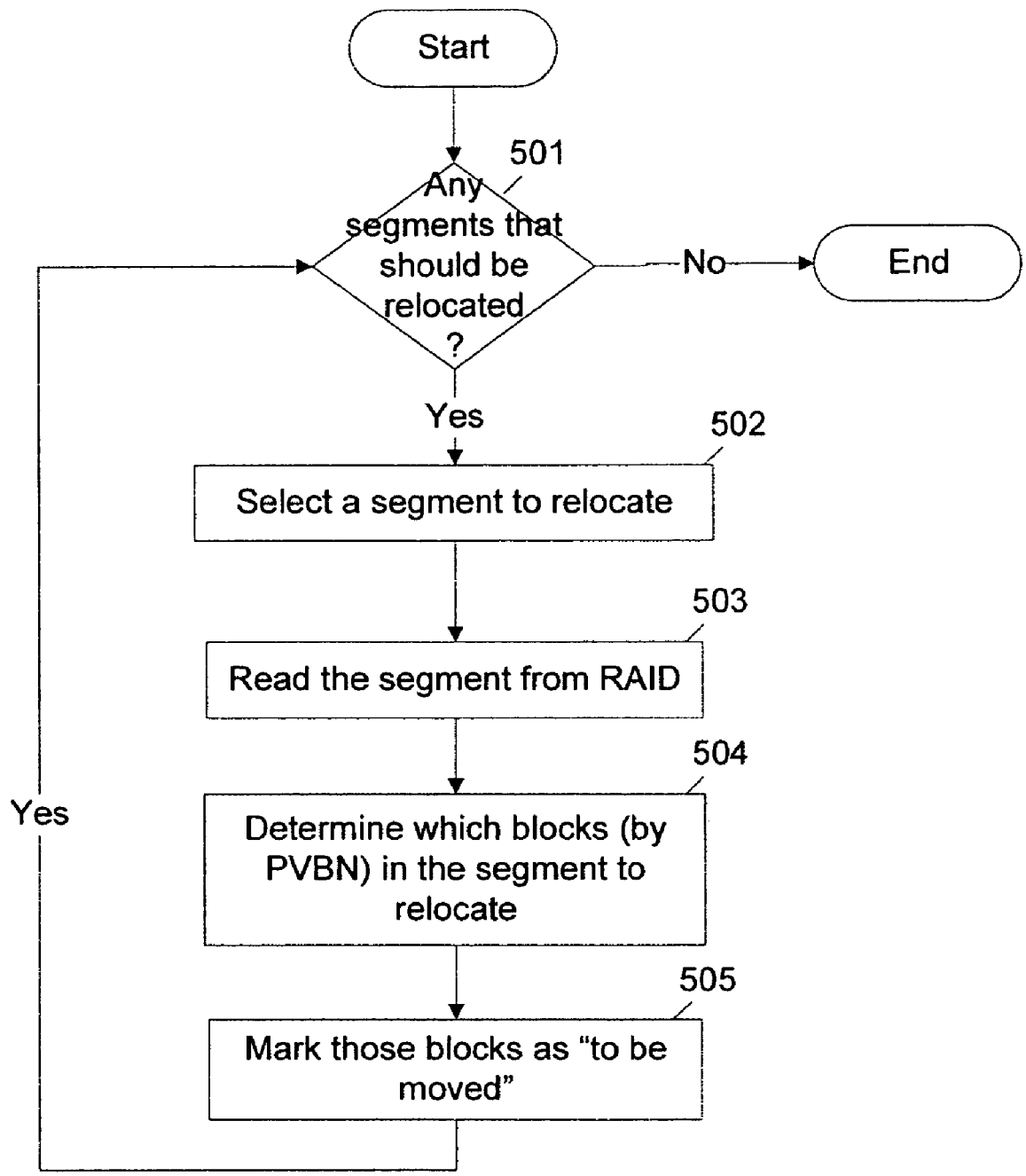
FIGS. 5A and 5B collectively show a process for relocating segments.
Figure 5B:
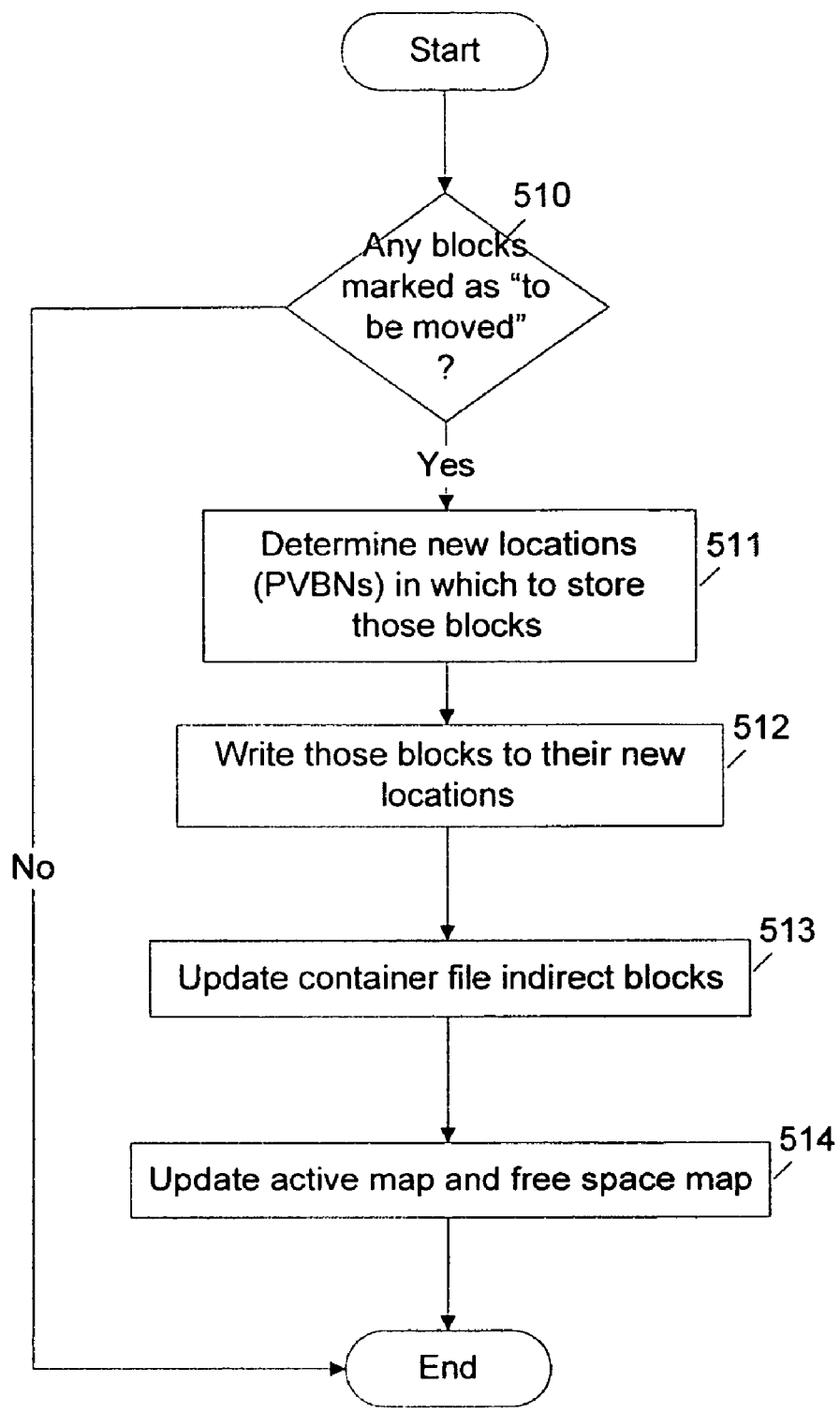

FIGS. 5A and 5B collectively illustrate an example of processes which may be performed by the storage server 2 to move segments, for purposes of defragmentation. FIG. 5A shows a process performed by the segment cleaner 30 to determine which segments can or should be relocated. This process can be performed at the time of a user-initiated read which affects the blocks on a given disk and/or as a background scan/defragmentation process. FIG. 5B shows a process by which the segments identified for relocation are actually moved. The process of FIG. 5B is performed at each "consistency point". A consistency point is the recurring event at which any new or modified data that has been temporarily cached in the storage server's memory is committed to long-term storage (e.g., disks). A consistency point typically occurs periodically (e.g., every 10 seconds) or in response to a predetermined condition occurring (e.g., a specified percentage of memory is full of "dirty" data).

Referring now to FIG. 5A, initially, at 501 a determination is made of whether any segments should be relocated (i.e., moved). As noted above, this determination can be made based on a predetermined defragmentation policy (which is not germane to the technique introduced here). If it is determined that no segment should be relocated, the process ends. If one or more segments should be relocated, then the process continues to 502. At 502, the process selects a segment to relocate. The process then reads that segment from the RAID layer 34 at 503, and determines at 504 which blocks in the segment (by their PVBNs) to relocate. The process then marks those blocks as "to be moved", so that they will be relocated at the next consistency point. This can be done by setting an appropriate flag or bit for each block to be moved. The process then loops back to 501, described above.

The process of FIG. 5B occurs at each consistency point (note that FIG. 5B represents only those operations which relate to the technique being introduced here, not every operation that may occur at a consistency point). Initially, at 510 the process determines whether any blocks are marked as "dirty", i.e., "to be moved". If no blocks are marked as to be moved, the process ends. If one or more blocks are marked as to be moved, then at 511 the process determines new on disk locations (i.e., new PVBNs) for those blocks. The process then writes the blocks to the new PVBNs at 512. Next, at 513 the process updates the PVBNs in the indirect blocks in the applicable container buffer tree(s) (more than one container buffer tree would need to be updated if there is more than one flexible volume allocated within a relocated segment). Specifically, the PVBNs for the moved blocks in the container buffer tree(s) are updated to reflect the blocks' new locations. At 514 the process updates the active map 31 (see FIG. 2) to reflect the fact that the PVBNs corresponding to the new locations are now in use by the active file system, and updates the free space map 32 to reflect the fact that the PVBNs corresponding to the old locations are now free (available for reuse).

At some point, the PVBNs in the affected user buffer tree can also be updated, to reflect the fact that certain blocks have been moved (doing so is not necessary but would improve read performance). However, one aspect of the technique introduced here is that the PVBNs in the user buffer tree do not necessarily have to be updated immediately or at all. This is advantageous, since there is a performance cost associated with having to load the user buffer tree into memory for purposes of updating PVBNs. Hence, the PVBNs can be updated at any convenient time, such as the next time the moved blocks are accessed by a read or write operation (which requires having the user buffer tree loaded into memory).

In order to avoid undesirable downtime, the storage server 2 should be able to service the client initiated reads and writes during the allocation process, even if the user buffer tree has not been updated yet. This capability raises the issues of: 1) how to determine whether a particular block being accessed is in fact the correct block; 2) if the block is determined not to be the correct block, how to distinguish a block that has been simply relocated (e.g., due to defragmentation) from a lost write; and 3) if a block has been moved due to defragmentation (or other reasons), how to find the block at its new location if its PVBN has not yet been updated in the user buffer tree.

As mentioned above, the technique introduced here examines metadata that is appended to a block being accessed, to determine whether the block is the correct block (i.e., the block intended to be accessed). This approach is now further described with reference to FIG. 4. As shown, every block 41 managed by the storage server 2 has a corresponding metadata field 42 appended to it when stored on disk. Each metadata field 42 includes a checksum for the block, the DBN of the block, and an embedded checksum for the metadata field itself. In addition, each metadata field also includes context information 43, created by the file system manager 31 for that block, i.e., the FBN, inode number, and generation number of the block. The inode number identifies the inode of the file which contains the block. The generation number is an increasing counter used to determine how many times the block has been written in place. Note that in the case of a flexible volume, the FBN and inode number are those of the corresponding container file; in that case, therefore, the FBN represents the VVBN within the flexible volume.

Figure 4:
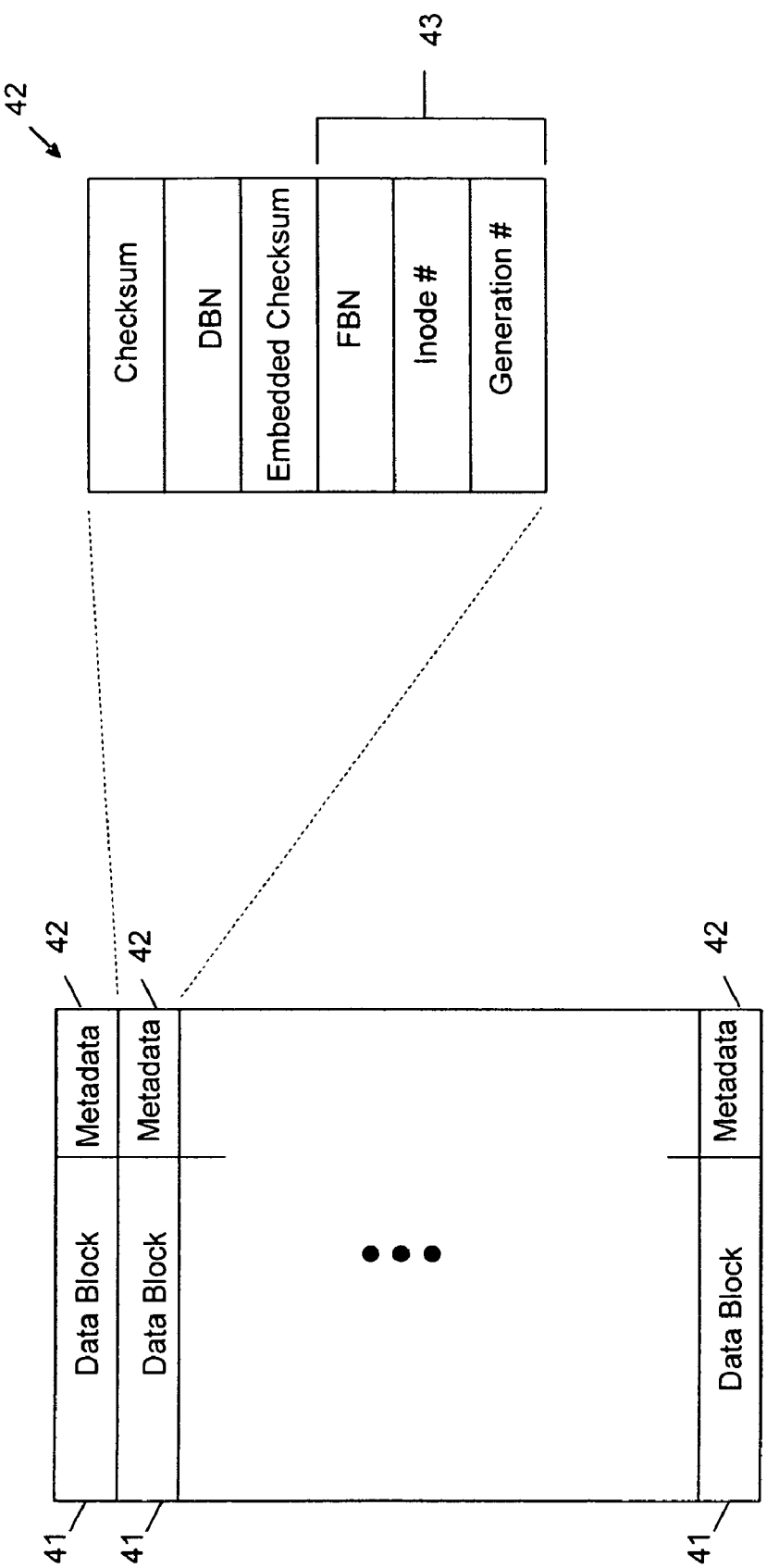
FIG. 4 shows blocks stored with appended metadata.

The context information 43 can be used, for example, to detect lost writes. A technique for using block-appended metadata such as shown in FIG. 4, to detect lost writes and/or for other purposes, has been implemented in version 7.0 of the Data ONTAP® storage operating system from NetApp® (initially sold in October 2004).

When a block is accessed, all of the file system context information 43 in its metadata field is compared to the expected values of that information. Among other items compared, the VVBN in the metadata field is compared to the VVBN in the bock's parent indirect block in the user buffer tree. If all of the context information 43 matches its expected values, the block is assumed to be the correct block. If there is any mismatch, however, then the block has either been relocated (e.g., due to the fragmentation), or a write was lost at some time prior to this determination.

If there is a mismatch in the metadata, the next issue is to determine whether a write was lost or the block has simply been relocated, and if the latter is true, to determine where the correct direct block is actually stored. To accomplish both goals, the corresponding container buffer tree is used. Specifically, the VVBN from the parent indirect block in the user buffer tree is used as an index into the container buffer tree, to locate the correct PVBN for the required block.

Once that block is located, its metadata is used in the same manner described above, to determine whether it is the correct block. If it is the correct block, then that block is returned to the calling process as the result. (Of course, a single client-initiated read request may require access to multiple blocks in this manner.) The PVBN in the corresponding parent indirect block in the user buffer tree is also corrected at a convenient time. If the block is not the correct block, then it is assumed that the required block was part of a lost write. In that case, an appropriate error message is returned to the calling process (which may initiate a lost write recovery mechanism, if available).

As noted above, to simplify description it is assumed herein that only direct (L0) blocks can be relocated, and that therefore, only the metadata of direct blocks is examined for mismatches, not indirect blocks. However, in a real implementation, blocks at any level of a buffer tree (including indirect blocks) potentially can be relocated. Therefore, in a real implementation it would also be desirable to examine metadata of indirect blocks for mismatches in this way.

Figure 6:
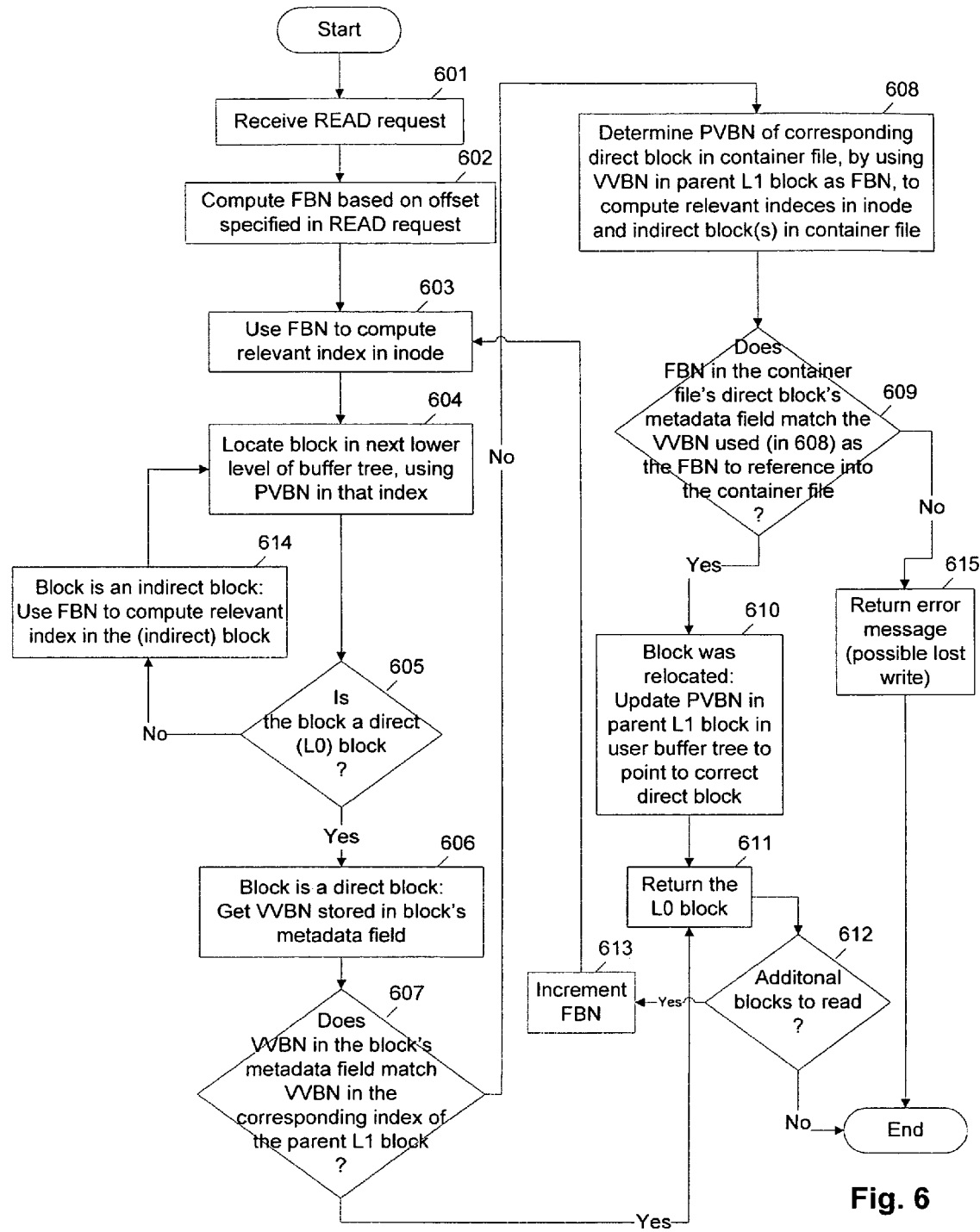
FIG. 6 shows a process for reading data, including identifying a block that has been moved.

This technique is now further described with reference to FIGS. 6 and 7. FIG. 6 shows an example of the process of handling a client-initiated read request. The process may be carried out by the file system manager 21. An example of how the process can be applied will be explained further below with reference to FIG. 7.

Initially, a read request is received at 601. It is assumed that the read request includes at least a filename, the offset of the first block to read in the file, and a length value (the number of blocks to read). At 602 the process computes the FBN of the first block to read, based on the offset specified in the request. The FBN of a block identifies the offset (block number) of the block within the file that contains the block. Hence, the FBN of the first block can easily be computed as the result of dividing the specified offset by the block size (which is known). If the result has a fractional component, it is rounded down to the nearest FBN value. The first FBN in a file is assumed to be FBN 0.

Once the FBN is computed, it is used at 603 to compute the relevant index (location) in the inode of the (user data) buffer tree of the file. This index contains a pair of associated pointers (PVBN and VVBN) to the relevant block in the next level down in the user buffer tree.

The relevant index in any given inode or indirect block can be computed according to the formula:

$$index = (FBN/Max\_descendants) \bmod Num\_indices$$

where:

Max_descendants is the maximum number of blocks (direct or indirect) that can be descendants of the current inode or indirect block, in all lower levels in the buffer tree, and Num_indices is the maximum number of indices (locations) in the current inode or indirect block.

Therefore, at 604, using the PVBN in the index of the inode computed from the FBN, the process locates the relevant block in the next lower level of the buffer tree. If that block is a direct (L0) block (605), then the process proceeds to 606. If not (the block is an indirect block), then at 614 the process uses the already-computed FBN to compute the relevant index in that indirect block; the process then loops back to 604, which is repeated based on that indirect block.

If the block is a direct block (605), then that block is potentially the block which is the target of the request (i.e., the block that was intended to be accessed). In that case, at 606 the process gets the VVBN stored in that block's metadata field. The process then determines at 607 whether the VVBN in that direct block's metadata field matches the VVBN in the corresponding index of that block's parent L1 block in the user buffer tree (the index which was used to locate that direct block in the first place). If the values of those two VVBNs match, it is concluded that the current direct block is the correct block (i.e., the target block); so at this point, the process continues processing the read operation normally. That is, the direct block is returned to the calling process at 611; and, if additional blocks need to be read in order to complete servicing of the read request (612), then at 613 the process continues by incrementing by one the FBN computed initially at 602, and then loops back to 603, described above. If no additional blocks need to be read, the process ends.

If the values of those two VVBNs do not match (607), that means the direct block has either been relocated or a write was lost (i.e., this direct block is not the target block), in which case, the process continues to 608. At 608 the process determines the PVBN of the corresponding direct block in the container file. This is done by using the VVBN, in the parent L1 block of the direct block in the user buffer tree, as an FBN, to compute the relevant indices in the inode and indirect blocks of the container buffer tree. An example of these operations (608) is described further with reference to FIG. 7.

Once the relevant direct block is found in the container buffer tree, the process next determines at 609 whether the FBN in the metadata field of that direct block matches the VVBN which was used as FBN into the container file, i.e., the VVBN in the L1 block in the user buffer tree. (As noted above, in the case of a flexible volume, the FBN value in the metadata field of a block is actually that of the container file and, therefore, it represents the VVBN within the flexible volume.) If the values of those two pointers do not match, this means that the block intended to the accessed was likely a lost write. Therefore, in that case the process returns an appropriate error message at 615, and then ends.

If the values of the two pointers match in 609, this means that the block was moved, and the located direct block in the container buffer tree is in fact the correct block. In that event, process continues to 610. At 610, the process updates the PVBN in the parent L1 block of the user buffer tree (i.e., the L1 block mentioned in 614, above) to point to the correct direct block. Note that this operation (610) does not necessarily have to be done at this time; it can be performed at any convenient time. The direct block from the container buffer tree is then returned to the calling process as the (at least partial) result of the read, at 611.

If additional blocks need to be read in order to complete servicing of the read request (612), then at 613 the process continues by incrementing by one the FBN computed initially at 602, and then loops back to 603, described above. If no additional blocks need to be read, the process ends.

Figure 7:
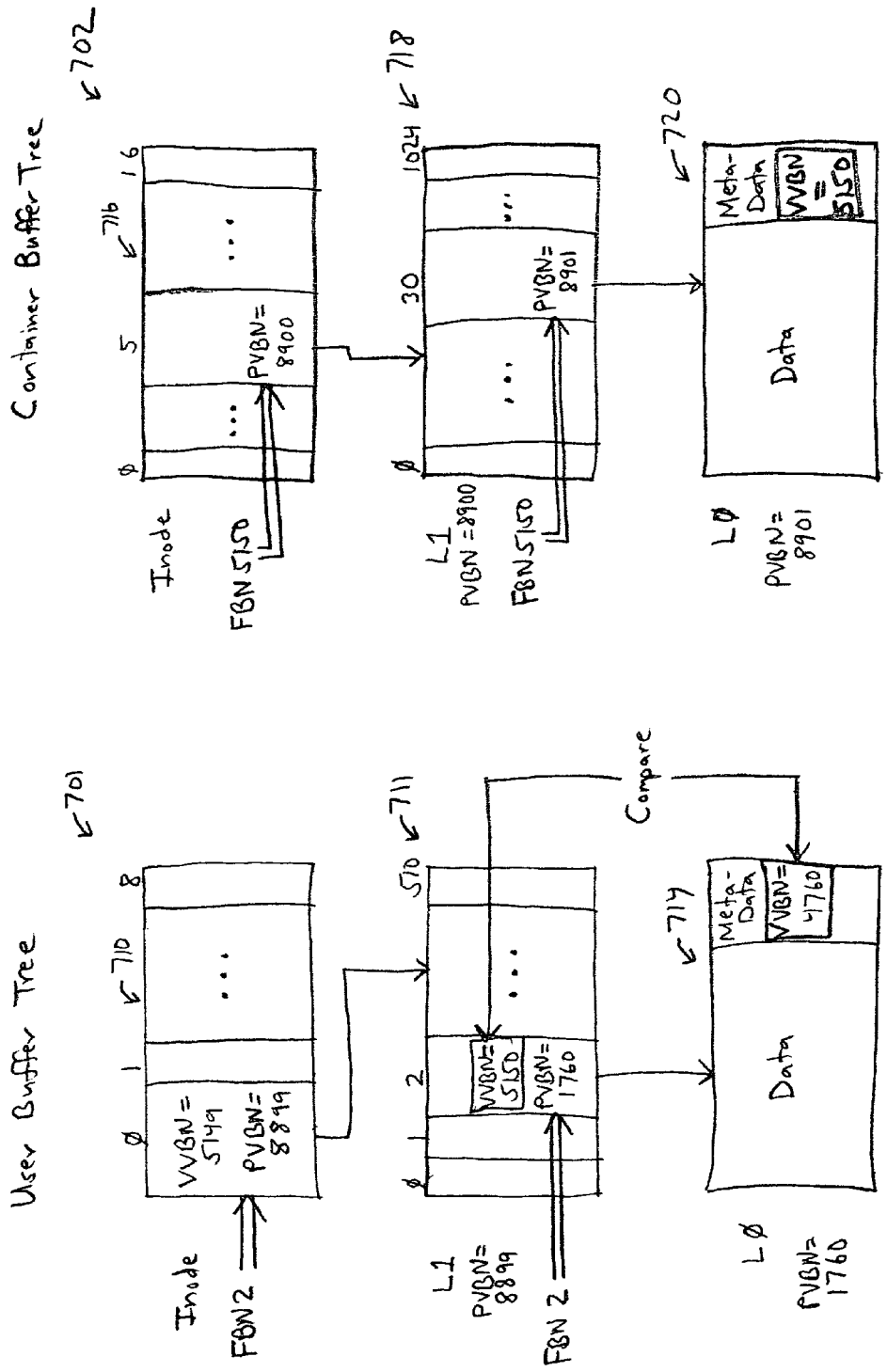
FIG. 7 shows an example of how a user buffer tree and a corresponding container buffer tree can be used to detect a possibly moved block and to distinguish a moved block from a lost write.

An example of the application of the process is now described further with reference to FIG. 7. The left side of FIG. 7 shows a simple example of a user buffer tree 701 for a particular file. The right side of FIG. 7 shows a simple example of the container buffer tree 702 which may represent the volume that contains the file.

Assume that there are eight indices (locations) in the inode 710 of the user buffer tree (i.e., eight PVBN-VVBN pairs), and 510 indices in each L1 indirect block 711 of the user buffer tree. Assume further that a client-initiated read request is received by the storage server 2, specifying a starting offset of 8192 in the file represented by the illustrated user buffer tree. Assume further that all blocks are 4 kB in length. Therefore, the starting offset of 8192 translates to an FBN of 2 (8192/4K, where the initial FBN is assumed always to be FBN 0), based on the formula given above.

The first objective after determining the FBN is to locate the relevant direct block 714 in the user buffer tree 701 (through the inode 710 and applicable indirect block 711), per operations 601 through 605 in FIG. 6. To locate the relevant L1 indirect block, the first step is to determine the index, in the inode of the user buffer tree, which contains the pointer to the relevant L1 indirect block. Based on the formula described above (index=(FBN/Max_descendants) modulo Num_indices), the index for FBN 2 in the inode of the user buffer tree is index 0 (index=(2/510) mod 510=0). Thus, index 0 of the inode 710 contains the PVBN and VVBN that point to the relevant L1 indirect block 711. In this example, the PVBN is 8899 and the corresponding VVBN is 5149.

Next, it is necessary to determine the index, in the L1 indirect block 711, which contains the pointer to the relevant direct block 714. Based on the formula described above, the index for FBN 2 in the L1 block is index 2 (index=(2/1) mod 510=2). Thus, index 2 of the L1 block in the user buffer tree contains the PVBN and VVBN which point to the relevant direct (L0) block 714. In this example, that PVBN is 1760 and the corresponding VVBN is 5150.

Next, the VVBN (which has value=5150) in the L1 block 711 is compared against the VVBN in the metadata field of the direct block 714, to determine whether they match. In the illustrated example, they do not, which means that the block was relocated or was a lost write. In that case, the container buffer tree 702 is then examined to attempt to locate the correct direct block. Specifically, the VVBN (with value=5150) from the L1 block 711 in the user buffer tree 701 is used as an FBN, to determine the appropriate indices in the container buffer tree 702.

Assume that the container file is 64 MB, which corresponds to a three-level container buffer tree (like the user buffer tree). The container file contains PVBNs but not VVBNs. Assume further that there are 16 indices in the inode 716 of the container buffer tree 702 (i.e., 16 PVBNs), and 1024 indices in each L1 indirect block 718 of the container buffer tree buffer tree.

Hence, FBN 5150 is used to locate the relevant direct block 720 in the container buffer tree 702 (through the inode 716 and the applicable indirect block 718), per operations 608 in FIG. 6. We first determine the index, in the inode 716 of the container buffer tree 702, which contains the pointer to the relevant L1 indirect block 720. Based on the formula described above (index=(FBN/Max_descendants) modulo Num_indices), the index for FBN 5150 in the inode of the container buffer tree is index 5 (index=(5150/1024) mod 1024=5). Thus, index 5 of the inode 716 contains the PVBN which points to the relevant L1 indirect block 718 in the container buffer tree 702. In this example, the PVBN is 8900.

Next, we determine the index, in the L1 indirect block 718, which contains the pointer (PVBN) to the relevant direct block 720. Based on the formula described above, the index for FBN 5150 in the L1 block is index 30 (index=(5150/1) mod 1024=30). Thus, index 30 of the L1 block 718 in the container buffer tree 702 contains the PVBN which points to the relevant direct (L0) block 720. In this example, that PVBN is 8901.

Next, the VVBN in the metadata field of the direct block 720 in the container buffer tree 702 is examined to determine whether it has value=5150 (per 609 in FIG. 6), i.e., the previously-determined value of the VVBN that was used as the FBN into the container buffer tree. If the VVBN in the metadata field does have this value (as shown in FIG. 7), then the direct block 720 in the container buffer tree 702 is the correct block, which is returned to the calling process. If the VVBN in the metadata field does not have this value, it is assumed that the required block was a lost write, in which case an appropriate error message is returned.

As noted above, the performance cost of identifying and finding relocated blocks in this way can be avoided in certain instances by relocating certain blocks in response to normal reads (e.g., client-initiated reads and/or RAID parity recomputations), i.e., by relocating blocks that are read by such reads. Doing so allows immediate updating of the user file buffer trees that contain those blocks with no additional performance cost (since the buffer trees must be loaded into memory anyway for the blocks being read), thus avoiding a subsequent metadata mismatch due to block relocation.

Note that the technique introduced above allows blocks to be moved even if those blocks are included in a PPI, such as a Snapshot. A Snapshot (i.e., a NetApp PPI), essentially consists only of pointers to data blocks in the active file system. This feature reduces the amount of data block duplication that can result from creating Snapshots, relative to other PPI techniques. Despite this characteristic, however, the availability of the container buffer tree and its use in the manner described above enables even blocks that are included in a Snapshot to be moved (e.g., for defragmentation) without losing the ability to locate those blocks when necessary.

Figure 8:
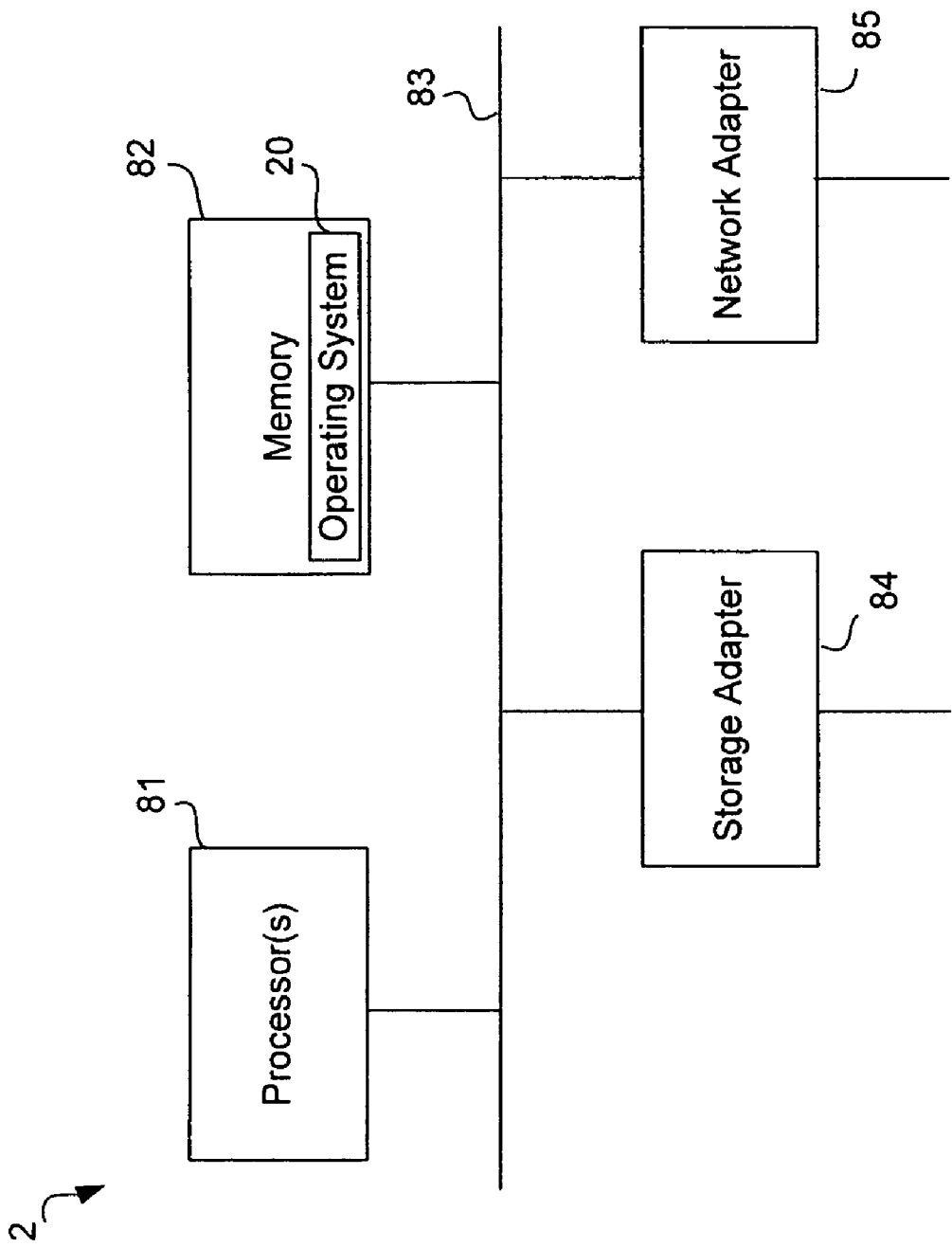
FIG. 8 shows an example of the hardware architecture of the storage server.

FIG. 8 is a block diagram showing an example of the architecture of the storage server 2 at a high level. Certain standard and well-known components which are not germane to the present invention are not shown. The storage server 2 includes one or more processors 81 and memory 82 coupled to a bus system 83. The bus system 83 shown in FIG. 8 is an abstraction that represents any one or more separate physical buses and/or point-to-point connections, connected by appropriate bridges, adapters and/or controllers. The bus system 83, therefore, may include, for example, a system bus, a form of Peripheral Component Interconnect (PCI) bus, Hyper-Transport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 81 are the central processing units (CPUs) of the file server 2 and, thus, control its overall operation. In certain embodiments, the processors 81 accomplish this by executing software stored in memory 82. Such processor 81 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 82 includes the main memory of the file server 2. Memory 82 represents any form of random access memory (RAM), read-only memory (ROM), flash memory, or the like, or a combination of such devices. Memory 82 stores (among other things) the storage server's operating system 20, which can implement the technique introduced herein.

Also connected to the processors 81 through the bus system 83 are a storage adapter 84 and a network adapter 85. The storage adapter 84 allows the file server 2 to access the storage subsystem 4 and may be, for example, a Fibre Channel adapter or a SCSI adapter. The network adapter 85 provides the file server 2 with the ability to communicate with remote devices, such as the clients 1, over a network and may be, for example, an Ethernet adapter, a Fibre Channel adapter, or the like.

Thus, a method and apparatus for defragmentation in a storage system and for detecting data moved during defragmentation have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a storage system, the method comprising:
    receiving, by the storage system, a data access request;
    identifying a first block stored in the storage system as potentially being a target block of the request by locating the first block in a first data structure;
    comparing a value in metadata appended to the first block with an expected value;
    determining that the target block has been relocated or lost if the value in the metadata does not match the expected value;
    upon detecting that the target block has been relocated or lost, identifying a second block as potentially being the target block by using the expected value to locate the second block in a second data structure;
    comparing a value in metadata appended to the second block with the expected value obtained from the first data structure;
    if the metadata appended to the second block matches the expected value, then confirming that the second block is the target block; and
    if the metadata appended to the second block does not match the expected value, then determining that a write has been lost.

2. A method as recited in claim 1, wherein the value in the metadata and the expected value are block identifiers.

3. A method as recited in claim 2, wherein the value in the metadata and the expected value are block pointers.

4. A method as recited in claim 2, wherein said first data structure contains block identifiers, and wherein the expected value is a block identifier obtained from the first data structure.

5. A method as recited in claim 4, wherein the value in the metadata, the expected value and all of said block identifiers are block pointers.

6. A method as recited in claim 1, further comprising:
    as part of a defragmentation strategy, relocating the second block in the storage system in response to a read operation that relates to the second block.

7. A method of operating a storage system, the method comprising:
    maintaining a first data structure and a second data structure, each defining an organization of stored data, the first and second data structure each including a first pointer to a particular stored block, the first data structure further including a second pointer associated with the particular stored block; and
    in response to a need to access the block,
        using the first pointer in the first data structure to attempt to locate the block,
        determining that the block has been moved or lost, and in response to such determination,
        using the second pointer to reference into the second data structure, to attempt to locate the block at a new location,
        comparing a value in metadata appended to the block at the new location with an expected value, and
        determining that the block has been moved if the expected value matches the value in the metadata and that the block has been lost if the expected value does not match the value in the metadata.

8. A method as recited in claim 7, wherein each of the first and second data structures is a hierarchical structure of blocks, and wherein said block is included in the second data structure both before and after the block is moved to the new location.

9. A method as recited in claim 8, wherein using the second pointer to reference into the second data structure, to locate the block at the new location comprises:
    using the second pointer to reference into the second data structure, to locate the block using the first pointer of the second data structure, and
    accessing the block at the new location using the first pointer of the second data structure.

10. A method as recited in claim 9, wherein said moving the block to a new location in the storage subsystem is done for the purpose of defragmentation.

11. A method as recited in claim 7, wherein the block is part of a persistent point-in-time image of a data set.

12. A method as recited in claim 7, wherein determining that the block has been moved or lost comprises:
    accessing metadata of a block referenced by the first pointer in the first data structure;
    comparing a value in the metadata of the block with an expected value; and determining that the block has been moved or lost if the expected value does not match the value in the metadata.

13. A method as recited in claim 12, wherein the metadata is appended to the block referenced by the first pointer in the first data structure.

14. A method as recited in claim 7, wherein the first pointer represents a physical address of the block in an aggregate of storage, and the second pointer represents an address of the block in a virtual data container defined within the aggregate.

15. A method as recited in claim 14, wherein:
the virtual data container is a volume defined within the aggregate;
the first data structure represents a file stored within the volume; and
the second data structure represents the volume.

16. A method of operating a storage system, the method comprising:
maintaining a first data structure and a second data structure, each defining an organization of a plurality of blocks stored in an aggregate of storage, the first and second data structures each including a first pointer to a particular block, the first data structure further including a second pointer associated with the particular block, the first pointer representing a physical address of the block in an aggregate of storage, the second pointer representing an address of the block in a virtual data container defined within the aggregate, the first data structure associating the first pointer with the second pointer;
moving the block to a new location in the aggregate as part of a defragmentation process, including updating the first pointer in the second data structure without requiring any update of the first pointer in the first data structure; and
in response to a request to access the block after the block has been moved to the new location,
determining that the first pointer is incorrect in the first data structure,
in response to determining that the first pointer in the first data structure is incorrect, using the second pointer to reference into the second data structure to locate a correct value of the first pointer in the second data structure, the correct value reflecting the new location of the block, and
accessing the block using the correct value of the first pointer.

17. A method as recited in claim 16, wherein the block is part of a persistent point-in-time image of a data set.

18. A method as recited in claim 16, wherein:
the virtual data container is a volume defined within the aggregate;
the first data structure represents a file stored within the volume; and
the second data structure represents the volume.

19. A method as recited in claim 16, wherein determining that the first pointer is incorrect comprises:
comparing an expected value to a value in metadata of a block referenced by the first pointer in the first data structure; and
determining that the first pointer is incorrect if the expected value does not match the value in the metadata appended to the block.

20. A method as recited in claim 19, wherein the metadata is appended to the block referenced by the first pointer in the first data structure.

21. A storage server comprising:
a communications interface through which to receive a data access request from a client;
a network interface through which to access a mass storage subsystem on behalf of the client in response to the data access request;
a file system manager to maintain a first data structure and a second data structure, each defining an organization of a plurality of blocks stored in an aggregate of storage, the first and second data structures each including a first pointer to a particular block which corresponds to the data access request, the first data structure further including a second pointer associated with the block and an association between the first and second pointers;
a write allocator to move the block to a new location, including updating the first pointer in the second data structure, without requiring any update of the first pointer in the first data structure; and
a read handler to respond to the data access request by accessing the block, after the block has been moved to the new location, by
determining that the first pointer is incorrect in the first data structure,
in response to determining that the first pointer in the first data structure is incorrect, using the second pointer and the second data structure to locate a correct value of the first pointer, the correct value reflecting the new location of the block, and
accessing the block using the correct value of the first pointer.

22. A storage server as recited in claim 21, wherein the write allocator moves the block to a new location as part of a defragmentation process.

23. A storage server as recited in claim 22, wherein the block is part of a persistent point-in-time image of a data set.

24. A storage server as recited in claim 21, wherein the second pointer represents an address of the block in a virtual data container defined within the aggregate, the first pointer represents a physical address of the block in the aggregate.

25. A storage server as recited in claim 24, wherein:
the virtual data container is a volume defined within the aggregate;
the first data structure represents a file stored within the volume; and
the second data structure represents the volume.

26. A storage server as recited in claim 22, wherein determining that the first pointer is incorrect comprises:
comparing an expected value to a value in metadata of a block referenced by the first pointer in the first data structure; and
determining that the first pointer is incorrect if the expected value does not match the value in the metadata appended to the block.

27. A storage server as recited in claim 26, wherein the metadata is appended to the block referenced by the second pointer in the second data structure.

* * * * *